LAMINATED FILTER FOR FLUID AMPLIFIERS

Filed Jan. 2, 1969 2 Sheets-Sheet 1

Inventors
Jeffrey N. Shinn,
Bert J. Czwakiel,
by Louis A. Moncha

LAMINATED FILTER FOR FLUID AMPLIFIERS

Filed Jan. 2, 1969 2 Sheets-Sheet 2

Inventors:
Jeffrey N. Shinn.
Bert J. Czwakiel,
by Louis A. Moucha

United States Patent Office 3,528,445
Patented Sept. 15, 1970

3,528,445

LAMINATED FILTER FOR FLUID AMPLIFIERS

Jeffrey N. Shinn, Scotia, and Bert J. Czwakiel, Schenectady, N.Y., assignors to General Electric Company, a corporation of New York Filed Jan. 2, 1969, Ser. No. 788,379
Int. Cl. F15c 1/14, 5/00
U.S. Cl. 137—81.5 13 Claims

ABSTRACT OF THE DISCLOSURE

A laminated filter structure is superposed adjacent the cover member of a fluid amplifier device having no moving mechanical parts for providing filtering and flow straightening of the input flows to the amplifier. The filter is a lamina having a plurality of fluid-flow filters formed therethrough and aligned with the input ports in the cover member. A pair of laminae having apertures therethrough aligned with the input ports in the cover member and of diameter greater than such ports may be superposed on both sides of the filter lamina for providing the function of manifolding the fluid flow into and from the filter.

LAMINATED FILTER FOR FLUID AMPLIFIERS

Figures 1, 2:
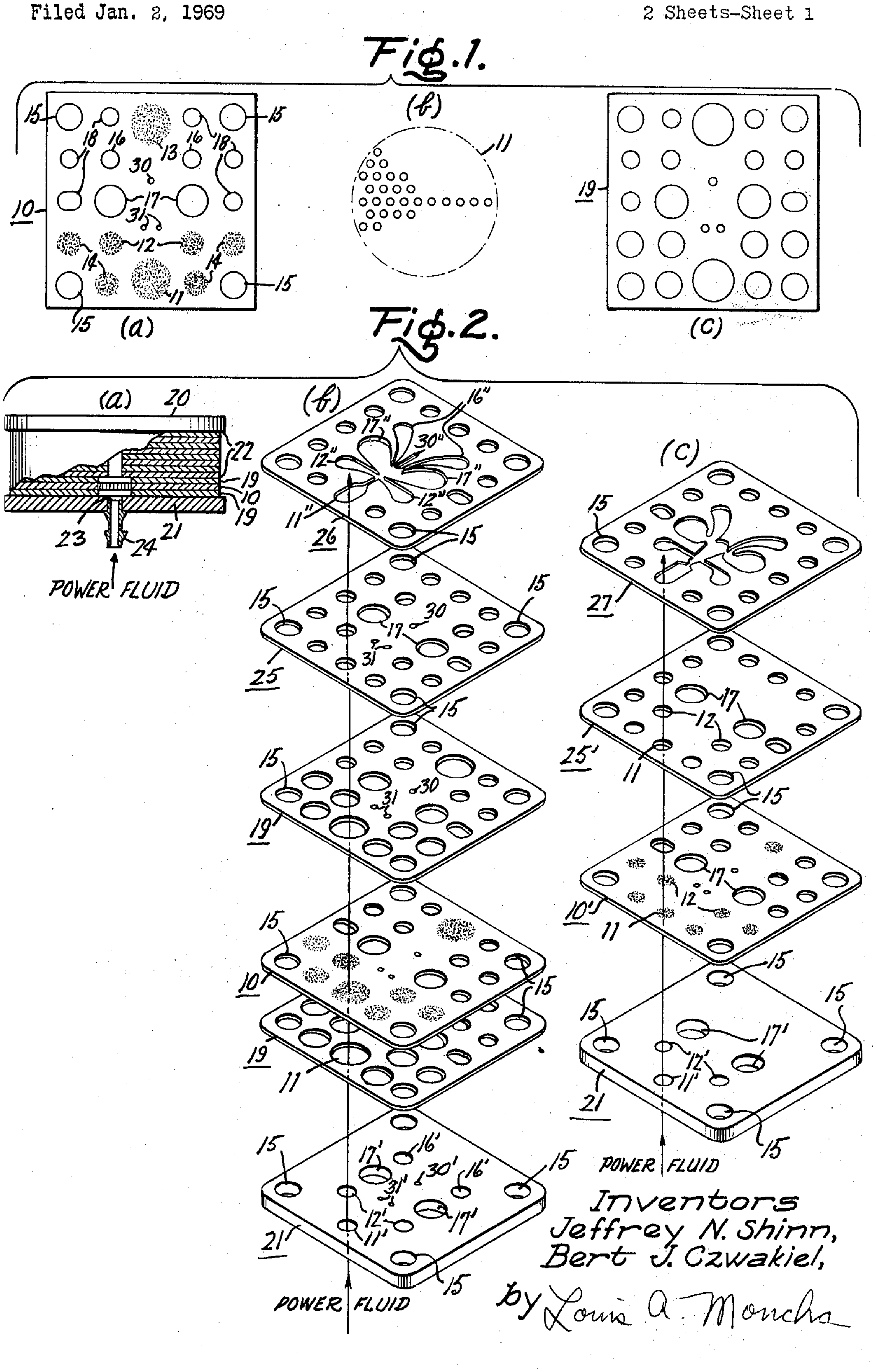

Our invention relates to a compact filter which is integral with a fluid amplifier having no moving mechanical parts, and in particular, to a laminated filter structure having filter elements photoetched through a lamina.

The recently developed fluid control devices having no moving mechanical parts and now generally known as fluid amplifiers or fluidic elements are beginning to find commercial applications in various fields. However, the anticipated widespread application of fluidics in control systems and other applications may be slowed by the unreliable operation of the fluid amplifier, due to the accumulation of isolated particles in the power fluid and control fluid input passages of the amplifiers. One of the major advantages of fluid amplifiers should be reliable operation under poor environmental conditions including particle laden atmospheres, and thus the full potentialities of fluid amplifiers have not been realized to the present time. External type filters are presently used in fluid amplifier applications for filtering the power and control fluid supplies, however, isolated particles inadvertently are left in the tubing interconnecting the filter with the fluidic element, or are formed when fastening the tubing on a sharp edged fitting, and may be sufficient to cause malfunction of one or more fluidic elements in a fluidic system. No filters for capturing such isolated particles are presently known, and thus there is a need for providing, preferably within the fluid amplifier device, what may be described as "last chance" filters.

Therefore, one of the principal objects of our invention is to provide a "last-chance" filter and flow straightener for fluidic applications.

Another object of our invention is to provide the filter in a low cost, laminated, compact form for integration into the fluid amplifier device.

A further object of our invention is to provide the filter having an accessibility for ease in cleaning.

In carrying out the objects of our invention, we provide a lamina which is superposed between the cover members of a fluid amplifier device and adjacent the particular cover member provided with the power fluid and control fluid input ports. The lamina is provided with a plurality of fluid flow filters formed therethrough and aligned with the input ports in the cover member, each filter comprising a plurality of closely spaced small holes. In applications wherein the pressure drop across the filters is to be minimized, the filter area is increased to increase the flow area. A pair of laminae may be superposed on both sides of the filter lamina and provided with aligned apertures having diameters greater than the diameters of the input ports in the cover member (but of area equal to the filter area) and greater than the input ends of the fluid amplifier input fluid flow passages for manifolding the fluid flow into and from the filters.

Figure 3:
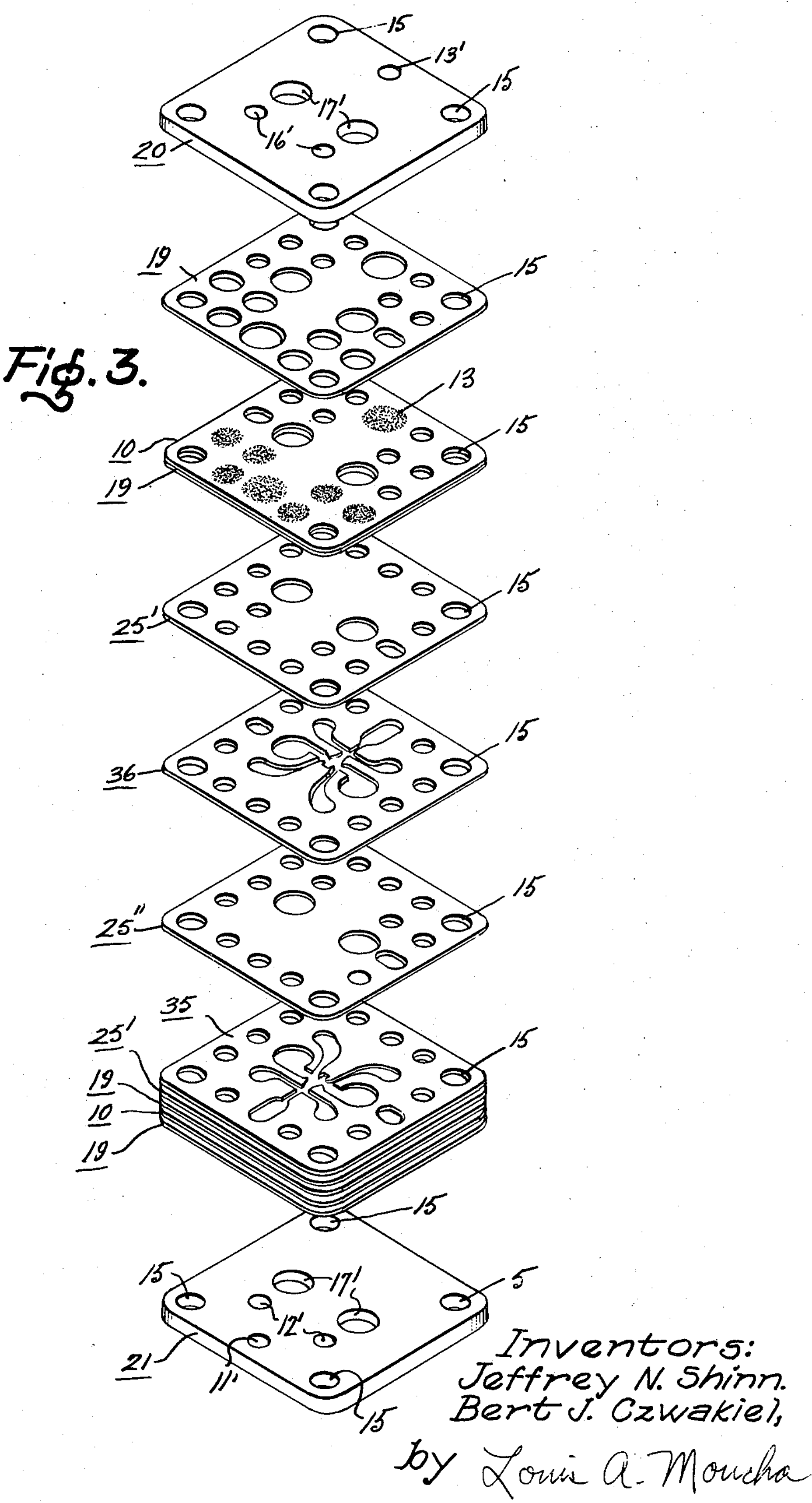

The features of our invention which we desire to protect herein are pointed out with particularity in the appended claims. The invention itself, however, both as to its organization and method of operation, together with further objects and advantages thereof, may best be understood by reference to the following description taken in connection with the accompanying drawing wherein:

FIGS. 1*a* and 1*c* are views in top plan of a filter lamina and manifold lamina, respectively, constructed in accordance with our invention, and FIG. 1*b* is an enlarged view of a portion of one filter in the filter lamina;

FIG. 2*a* is a side view of a laminated fluid amplifier device, partly in section, illustrating the use of our laminated filter structure at the input end of the device;

FIGS. 2*b* and 2*c* illustrate unassembled views of the input end portions of single-stage fluid amplifier devices with and without the manifold laminae, respectively; and FIG. 3 illustrates an unassembled view of a two-stage amplifier device employing an additional laminated filter structure for the second stage amplifier.

Referring now in particular to FIG. 1*a*, there is shown a filter lamina constructed in accordance with our invention. The fluid-flow filter lamina 10 may be constructed of any suitable material which is nonreactive with the fluid medium utilized by the fluid amplifier device of which lamina 10 is an integral element thereof. However, since a convenient method for forming the very small holes which comprise each filter in lamina 10 is the conventional injection molding or photoetching process, lamina 10 is preferably constructed of a plastic or metal, respectively. The dimensions of the face of lamina 10 and the thickness thereof is determined by the particular fluidic element integrated with the filter lamina 10. Thus, in the case of a laminated single-stage amplifier device, the face of lamina 10 may be square or slightly rectangular, FIG. 1*a* illustrating an enlarged view of such embodiment. In the case of a multi-stage amplifier device such as the type illustrated in copending application S.N. 752,098 entitled, "High Signal-to-Noise Fluid Amplifier and Fluidic Components," inventor Thomas F. Urbanosky, and assigned to the assignee of the present invention, the length and width dimensions of the filter lamina would conform to the dimensions of the other laminae which form such multistage device. Although our filter lamina is especially well adapted for integration in laminated single and multistage fluid amplifier devices of the type described in the above-identified Urbanosky patent application, it may also be utilized in the nonlaminated type fluid amplifiers comprised by merely two cover members wherein the fluid flow passages of the amplifier are formed into the inner surfaces of one of the cover members.

In the most simple embodiment of our invention, the laminated filter structure consists only of filter lamina 10 superposed between the two cover members of a fluid amplifier device in fluid-tight relationship therewith and adjacent the particular cover member wherein are provided the input ports for supplying the power fluid and control fluids to the input fluid flow passages of the fluid amplifier defined between the cover members. In the case wherein the adjacent cover member is provided only with the input ports, filter lamina 10 is provided with a plurality of filters of number at least corresponding to the number of input ports. Thus, for a conventional type fluid amplifier device having at least two, and generally three, inputs comprising a power nozzle and a pair of opposed control nozzles, power fluid filter 11 and control fluid filters 12 are provided in lamina 10. However, for purposes of standardization and resultant lower manufacturing costs, lamina 10 is further provided with filters 13 and 14. The four filters 14 permit lamina 10 to be employed with various digital type logic fluid amplifiers such as the OR-NOR logic device wherein the control nozzles may be disposed on only one side of the power jet, or with analog type fluid amplifiers utilizing three or more control fluid inputs. Filter 13 is utilized in a two-stage amplifier application as will be described hereinafter with relation to FIG. 3. The particular sizes and locations of the various filters in lamina 10 are determined by the sizes and location of the corresponding input ports in the adjacent cover member which are aligned with particular filters in lamina 10, and by the input ends of the input fluid flow passages of the fluid amplifier device or devices defined between the two cover members of the device.

In a specific example of a single-stage fluid amplifier device, the face of filter lamina 10 has dimensions of 1 x 1 inch and a thickness of 0.002 inch. Filters 11–14 are each of circular shape and comprise a plurality of small closely spaced circular holes photoetched therethrough The two power fluid filters 11 and 13 each have a diameter of approximately 3/16 inch and the six control fluid filters 12 and 14 each have a diameter of approximately 1/8 inch. For purposes of illustration, and not by way of limitation, each of the filters consists of a pattern of straight, parallel rows of holes each having a diameter of 0.005 inch and adjacent hole center-to-center spacing of 0.008 inch. Again, for purposes of illustration only, the net flow area of each filter is approximately 1.6 times the flow area of the input fitting (24 in FIGURE 2*a*) attached to the corresponding input port in the cover member. Filter lamina 10 is retained in fluid-tight relationship between the cover members of the fluid amplifier device by any convenient means. One suitable retaining means is the use of circular apertures 15 in the four corners of lamina 10, aligned with similar apertures in any other lamina comprising the device and the cover members, and appropriate screws passing therethrough. A pair of apertures 16 are also provided in lamina 10 in alignment with output ports which may also be located in the adjacent cover member, and also aligned with the corresponding output ends of the output fluid flow passages or receivers of the fluid amplifier. In like manner, a pair of apertures 17 are provided intermediate apertures 12 and 16 in alignment with venting ports in the adjacent cover member and the corresponding output ends of side vent passages disposed between the receivers and the control nozzles of the amplifier. The remaining six apertures 18 are not used in a basic single-stage fluid amplifier device but find utility as manifolding and interconnecting means for more complex fluidic circuits. Such uses for apertures 18 are described in detail in the above-referenced Urbanosky patent application. All of the apertures in lamina 10 are preferably circular, but may be noncircular, as desired.

FIG. 1*b* illustrates an enlarged view of a portion of one of the filters illustrated in FIG. 1*a*. Assuming, for example, that the filter in FIG. 1*b* represents filter 11, such filter has an overall diameter of approximately 3/16 inch and each photoetched hole in the filter has a diameter of 0.005 inch and hole center-to-center spacing of 0.008 inch for the specific example hereinabove described. These particular dimensions provide a filter wherein approximately 35% of the area is constituted by the holes. The filter holes may obviously be varied in both size and adjacent hole spacing, but preferably constitute a percentage of the area of the filter in a range of 20 to 70%. Also, in the general case the filter holes are preferably of equal diameter and in the range of 0.002 to 0.020 inch diameter, although smaller holes may be used. Also, the filter and filter holes may be of noncircular shape, as desired. Any variation in the size of the filter holes or spacing obviously changes the percent of flow area in each filter. It can be appreciated that any process for accurately locating and forming the filter holes through the filter lamina to obtain satisfactory filter operation may be employed, and the inherent accuracy of the photoetching and injection molding processes are especially well adapted for this purpose.

For many applications, the filters in filter lamina 10 are of the same size as the ports in the adjacent cover member and the input ends of the input fluid flow passages aligned therewith. However, the use of such filter lamina 10 adjacent the cover member of the fluid amplifier device results in a pressure drop in the fluid passing therethrough in the range of approximately 6 to 10% of the pressure supplied to the element. For many applications this pressure drop is excessive and is reduced by increasing the filter area thereby increasing the flow area through the lamina. In such case a lamina 19, illustrated in FIG. 1*c*, is preferably superposed between the cover member and filter lamina 10. Lamina 19 is provided with apertures of substantially identical size and location as the apertures and filters in lamina 10 and thus provides a manifolding action to the fluid flowing from the cover member to the filter lamina. A second manifold lamina 19 is also preferably superposed on the opposite side of filter lamina 10 from the first manifold lamina since one or more of the input ends of the input fluid flow passage in the fluid amplifier are then of smaller size than the area of the filter aligned therewith. The use of filter lamina 10 and two manifold laminae 19 results in a pressure drop of approximately 2 to 4% of the supply pressure and does not significantly change the performance of the fluid amplifier element. Thus, our laminated filter structure may comprise a single filter lamina 10, a filter lamina 10 and one manifold lamina 19, or a filter lamina 10 and two manifold laminae 19. The manifold lamina, in general, is of greater thickness than the filter lamina. Typical ranges of thickness for the filter and manifold lamina are 0.001 to 0.005 inch and 0.005 to 0.020 inch, respectively. Obviously, these thickness ranges are not limitations on our invention since particular applications may dictate thicknesses outside these ranges.

A typical example of a fluid amplifier device incorporating our laminated filter structure is illustrated in the partly sectioned illustration of FIG. 2*a*. The fluid amplifier device comprises a top cover member 20, a bottom cover member 21, a laminated filter structure comprising filter lamina 10 and two manifold laminae 19, and a plurality of intermediate laminae 22. For purposes of simplicity, bottom cover member 21 is illustrated as having only one input port 23 for supplying the power fluid to the fluid amplifier circuitry defined in the laminae 22. Input fitting 24 is secured within port 23 for providing a fluid-tight assembly at such input. It should be noted that the first manifold lamina 19 is superposed adjacent cover member 21, and the second manifold lamina 19 is superposed on the opposite side of filter lamina 10. The wider dimension of the filter in lamina 10 and aligned apertures in laminae 19, compared to the width of the input port 23 and the channel extending vertically upward through laminae 22, is clearly evident in FIG. 2*a*. The fluid-tight retaining means have not been illustrated for the sake of simplicity.

Referring now to FIG. 2*b*, there is shown an unassembled view of the input end of a single-stage analog fluid amplifier having a laminated structure of the type shown in FIG. 2*a*. By the input end is meant the portion of the device up to, and including, the first lamina provided with the fluid flow passages (flow pattern) defining the amplifier. Thus, the various elements shown in superposed position just prior to assembly comprise in the order named, bottom cover member 21, first manifold lamina 19, filter lamina 10, second manifold lamina 19, spacer lamina 25 and flow pattern lamina 26. For this particular embodiment, the output and vent ports are provided through bottom cover member 21, it being recognized that they could be provided through the top cover member (not shown). The purpose of the spacer lamina 25, in this embodiment, is to reduce and thereby match the cross-sectional areas of the vertical channels for the input fluids flowing upward from the second manifold lamina 19 to lamina 26 to the cross-sectional areas of the input ends of the input fluid flow passages in lamina 26. Flow straightening is provided by the presence of the plurality or screen of small filter holes in lamina 10; the screen breaks up incoming large-scale turbulence and vorticity to result in more uniform velocity-profile flow downstream of the filter. The screen thus isolates the fluidic element power (and control) nozzle from upstream flow-disturbances such as sharp radii and orifices. The number and size of the filter holes relative to the filter diameter determines the amount of flow straightening obtained. As one typical example, an effective degree of flow straightening is obtained for the holes of 0.005 inch diameter, 0.008 inch spacing and $\frac{3}{16}$ inch filter diameter hereinabove described. The spacer lamina also assures that the larger input apertures in lamina 19, aligned with filters 11 and 12 in lamina 10, do not overlap elements other than the input ends of the assocciated input flow passages in lamina 26. Each of laminae 19 and 25 is provided with twenty-five apertures, (seventeen apertures and eight filters in the case of filter lamina 10) which are aligned as indicated in the drawing, the filter 11 being aligned with the power fluid input port 11′ in cover member 21 and the input end 11″ of the power fluid passage in lamina 26, the filters 12 aligned with the control fluid input ports 12′ and the input ends 12″ of the control fluid passages in lamina 26, the apertures 16 aligned with the output ports 16′ and the output ends 16″ of the receivers in lamina 26, and the apertures 17 aligned with the side vent ports 17′ and the output ends 17″ of the side vent passages in lamina 26. Obviously, a smaller or greater number of apertures (and filters in lamina 10) can be provided, as desired. The various vents for the analog fluid amplifier, all of which may not be necessarily utilized, are open to the atmosphere through the vent ports in bottom cover member 21 and preferably also through aligned vent ports in the top cover member (not shown) and alternatively could be open through the sides of the laminae. Thus, the side vents 17″ in lamina 26 are open to the atmosphere as described hereinabove, the center vent 30″ is open to the atmosphere through aligned apertures 30 in laminae 10, 19, 25 and center vent port 30′ in cover member 21, and the two small vent holes 31 at each upstream side of the side vent passages immediately adjacent the power nozzle (more completely described in the copending Urbanosky patent application) are open to the atmosphere through aligned apertures 31 and vent port 31′. As described hereabove, a convenient means for assembling the laminated fluid amplifier into a fluid-tight device is the use of four screws passing through the aligned four corner apertures 15 in each of the laminae and cover members. The ease of assembly and disassembly of the device provides accessibility for ease in cleaning the filters in lamina 10. Appropriate fittings are then attached to the power fluid input port, control fluid input ports and output ports for connection of the device into an appropriate fluidic circuit.

A second embodiment illustrating the use of our laminated filter structure is shown in FIG. 2*c* depicting an unassembled view of the input end of a single-stage digital fluid amplifier having a laminated structure. In particular, the laminae correspond to the laminae depicted in FIG. 2*b* with the omission of the manifold laminae 19. As described hereinabove, one or both of the manifold laminae may be omitted if the larger pressure drop occurring through the filter laminae 10′ in the absence of the manifold laminae may be tolerated. Since the manifolding action of laminae 19 is not utilized in this embodiment, no purpose is served other than standardization, in utilizing the larger area filters depicted in lamina 10 in FIG. 2*b*, and the smaller area filters are depicted in lamina 10′. Since the digital amplifier is not provided with a center vent 30″ and small vent holes 31″, such apertures are omitted in lamina 25′ and corresponding vents omitted in the cover members. For purposes of illustrating an alternative of the FIG. 2*b* embodiment, the output ports are not provided in bottom cover member 21 (and thus would be provided in the top cover member, not shown), and for this reason spacer lamina 25′ is also not provided with apertures 16 aligned with the output ends of the receivers in lamina 27.

FIG. 3 illustrates an unassembled view of a third embodiment of our laminated filter structure integrated in a laminated fluid amplifier device. The embodiments illustrated in FIGS. 2*b* and 2*c* each utilize only a single filter lamina in a single-stage device. The FIG. 3 embodiment utilizes two laminated fluid-flow filter structures integrated in a two-stage digital fluid amplifier device. In particular, there are superposed in the order named, bottom cover member 21, a first manifold lamina 19, a first filter lamina 10, a second manifold lamina 19, a first spacer lamina 25′, a first flow pattern lamina 35 defining a first stage digital fluid amplifier, a second spacer lamina 25″, a second flow pattern lamina 36 defining the second stage digital amplifier, a third spacer lamina 25′, a third manifold lamina 19, a second filter lamina 10, a fourth manifold lamina 19, and top cover member 20. The various apertures, filters and ports are aligned as previously described. As in the case of the FIGS. 2*b* and 2*c* embodiments, each stage amplifier may comprise more than one flow pattern laminae to obtain the desired aspect ratio and flow capacity rating for the amplifier. The top cover member 20 may be superposed adjacent the fourth manifold lamina 19, as illustrated, or, additional laminae containing other fluid amplifier circuitry such as passive fluid flow resistors may also be provided intermediate the fourth manifold lamina 19 and top cover member 20 as in the case of the FIGS. 2*b* and 2*c* embodiments. With the arrangement of the various superposed laminae as indicated in FIG. 3, the outputs of the receivers of the first stage amplifier are in communication with the control fluid inputs of the second stage amplifier, and the outputs of the receivers of the second stage amplifier are in communication with output ports 16′ in top cover member 20. Thus, for the particular illustrated arrangement of our third embodiment, only the first stage input ports 11′, 12′ and side vent ports 17′ are located in bottom cover member 21. The power fluid input to the second stage amplifier is channeled downward from input port 13′ in top cover member 20 through the aligned apertures and filter 13 in laminae 19 and 10, respectively. It should be noted that the flow pattern of the second stage amplifier is reversed from that of the first stage. In some applications, both power fluid supplies may be brought through one cover member, and then only one filter lamina is required. Side vent ports 17′ are also provided in top cover member 20. The lack of apertures 16 in the first (and third) spacer lamina 25′ aligned with the receivers of the first stage amplifier (and control inputs of the second stage amplifier) prevent the outputs (and inputs) thereof from passing through the first (and last) three laminae 19, 10 and 19. In like manner, the absence of apertures 12 in the second spacer lamina 25″ (which is really lamina 25′ reversed) aligned with the control inputs of the first stage amplifier prevent an interconnection of the first stage control inputs and the second stage outputs. It can be appreciated that the FIG. 3 embodiment may be modified to channel the output of the second stage amplifier to output ports in the first cover member 21 by the use of an additional lamina provided with suitable bypass passages for directing the output of the second stage receivers to apertures which are not in use in the intermediate laminae, such as the apertures 18 indicated in FIG. 1*a*. Finally, additional stages of amplifiers may easily be added to the FIG. 3 embodiment by utilizing an additional spacer lamina 25 and reversed flow pattern lamina for each additional stage. In all of the hereinabove embodiments described, each filter is of the "last chance" type in that it is not intended to condition the input fluid but merely to capture any isolated particles which either escaped the main filter or were generated between the main filter and the fluid amplifier. Further, each filter also functions as a flow straightener to increase the stability and assure repeatability of amplifier operation. In the absence of the filter flow straightener, a slight misalignment of an input fitting in the input port of the cover member or other upstream flow disturbance can result in large scale turbulence or vorticity in the fluid stream in the fluidic element, and nonrepeatability (inconsistency) of element operation.

In view of the foregoing description, it is believed that the objects of our invention have been attained. In particular, we have provided a filter of the last-chance type which is of laminated structure and is assembled integral with the particular fluid amplifier device. The laminated filter structure, which also functions as a flow straightener, is very compact due to its laminated construction, and is of low cost. The filter may be easily cleaned due to the ease of disassembly of the fluidic device and resultant accessibility of the filters. In the case of additional fluidic circuitry interconnected with fluid amplifier devices between the two cover members, and which provide 90° bends to fluid flow, additional laminated filter structures may be utilized merely for the flow straightening function.

Having described three embodiments of fluid amplifier devices utilizing our laminated filter structure, it is believed obvious that changes may be made therein which fall within the scope of our invention as defined by the following claims.

What we claim as new and desire to secure by Letters Patent of the United States is:

1. In an improved fluid amplifier device having no moving mechanical parts and including two cover members and at least two input fluid flow passages, a fluid jet interaction chamber and at least one output fluid flow passage defined between the cover members, first of the cover members provided with ports aligned with input ends of the input fluid flow passages, the improvement comprising a first lamina superposed between said cover members adjacent the first cover member and comprising a plurality of fluid-flow filters formed therethrough and aligned with the input ends of the input fluid flow passages, and means for retaining the first lamina in fluid-tight relationship between the cover members.

2. In the improved fluid amplifier device set forth in claim 1 wherein the device includes three input fluid flow passages and two output fluid flow passages, the first cover member further provided with ports aligned with output ends of the output fluid flow passage, said lamina retaining means comprise four aligned apertures formed through said first lamina and the cover members, and screws passing through the aligned apertures, and said first lamina further comprising fifth and sixth apertures aligned with the output ends of the output fluid flow passages.

3. In the improved fluid amplifier device set forth in claim 1 wherein each of the plurality of fluid-flow filters comprises a plurality of closely spaced small holes photoetched through said first lamina, each hole having a diameter in the range of 0.002 to 0.020 inch.

4. In the improved fluid amplifier device set forth in claim 1, the improvement further comprising a second lamina superimposed between said first lamina and the first cover member in fluid-tight relationship, said second lamina comprising a plurality of apertures aligned with the input ends of the input fluid flow passages, the apertures each having a diameter greater than the diameter of the corresponding aligned port in the cover member whereby said second lamina functions to manifold the fluid flows passing from the ports in the first cover member into the filters in said first lamina.

5. In the improved fluid amplifier device set forth in claim 4, the improvement further comprising a third lamina superposed on the opposite side of said first lamina from the second lamina, said third lamina comprising a like plurality of apertures as in said second lamina and of the same dimension and orientation whereby said third lamina functions to manifold the fluid flows passing from the filters in said first lamina into the fluid flow passages.

6. In the improved fluid amplifier device set forth in claim 3 wherein the filter holes comprise 20 to70% of the area of each filter.

7. In the improved fluid amplifier device set forth in claim 3 wherein said first lamina has a thickness in the range of up to 0.005 inch for filter holes of 0.005 inch diameter.

8. In an improved fluid amplifier device having no moving mechanical parts and including two cover members and a plurality of superposed laminae therebetween wherein at least one of the laminate have formed therethrough at least two input fluid flow passages, a fluid jet interaction chamber, and at least one output fluid flow passage and a pair of side vent passages, first of the cover members provided with ports aligned with input ends of the input fluid flow passages, the improvement being a laminated filter structure comprising a first lamina superposed between the first cover member and the plurality of superposed laminae, said first lamina comprising at least two fluid flow filters formed therethrough and aligned with the input ends of at least two input fluid passages, and means for retaining the plurality of superposed laminae and said first lamina in fluid-tight relationship between the cover members.

9. In the improved fluid amplifier device set forth in claim 8, the laminated filter structure further comprising a second lamina superposed between said first lamina and the first cover member, a third lamina superposed between said first lamina and the plurality of superposed laminae, said second and third laminae each provided with at least two apertures aligned with the input ends of the at least two input fluid flow passages, the area of the filters and apertures being greater than the area of the corresponding ports in the first cover member aligned therewith whereby said second and third laminae function to manifold the fluid flow into and from the filters in said first lamina, and means for retaining said second and third laminae in fluid-tight relationship between the cover members.

10. In the improved fluid amplifier device set forth in claim 9 wherein the first cover member is further provided with ports aligned with the output end of the output fluid flow passage and output ends of the side vent passages, said first, second and third lamina each further provided with apertures aligned with the output end of the output fluid flow passage and the output ends of the side vent passages.

11. A laminated filter and flow straightener structure in a fluid amplifier device having no moving mechanical parts and comprising a first lamina superposed adjacent a first cover member of a fluid amplier device wherein the first cover member is provided with a plurality of circular input ports aligned with input ends of input fluid flow passages of a fluid amplifier defined between the first and second cover members, said first lamina provided with a like first plurality of fluid-flow filters and aligned with the input ports in the first cover member, each filter comprising a plurality of closely spaced small holes formed through said first lamina to thereby provide the functions of both a fluid flow filter and flow straightener, and means for retaining said first lamina in fluid-tight relationship between the cover members of the fluid amplifier device to thereby form an integral device.

12. The laminated filter and flow straightener structure set forth in claim 11 and further comprising a second lamina superposed between the first cover member and said first lamina, a third lamina superposed adjacent said first lamina on the opposite side from said second lamina, said second and third laminae each provided with a like first plurality of apertures aligned with the input ports in the first cover member, each group of aligned apertures and filter having an area greater than the area of the input port aligned therewith to thereby manifold the fluid flow into and from the filter in said first lamina, and means for retaining said second and third laminae in fluid-tight relationship between the cover members.

13. The laminated filter and flow straightener structure set forth in claim 12 wherein said first lamina is provided with a second plurality of fluid-flow filters and a second plurality of apertures, the second plurality of filters adapted for use with fluid amplifiers having input fluid flow passages oriented differently from the passages associated with the first plurality of filters, the second plurality of apertures adapted for functions such as channeling the output ends of output fluid flow passages of the fluid amplifier to a different position and the like, said second and third laminae each provided with a third plurality of apertures aligned with the second plurality of filters and second plurality of apertures in said first lamina and of equal size therewith.

References Cited

UNITED STATES PATENTS

| | | | |
|---|---|---|---|
| 3,390,691 | 7/1968 | Jones | 137—81.5 |
| 3,426,781 | 2/1969 | Neuman | 137—81.5 |
| 3,442,280 | 5/1969 | Boothe | 137—81.5 |
| 3,461,900 | 8/1969 | Dexter et al. | 137—608 X |
| 3,465,772 | 9/1969 | Monge et al. | 137—608 X |

M. CARY NELSON, Primary Examiner

W. R. CLINE, Assistant Examiner